Oct. 13, 1970  A. MARZOCCHI  3,533,834
METHOD AND APPARATUS FOR IMPREGNATING POROUS SHEET MATERIAL
FORMED OF FIBROUS MATERIAL
Filed May 17, 1966  3 Sheets-Sheet 1
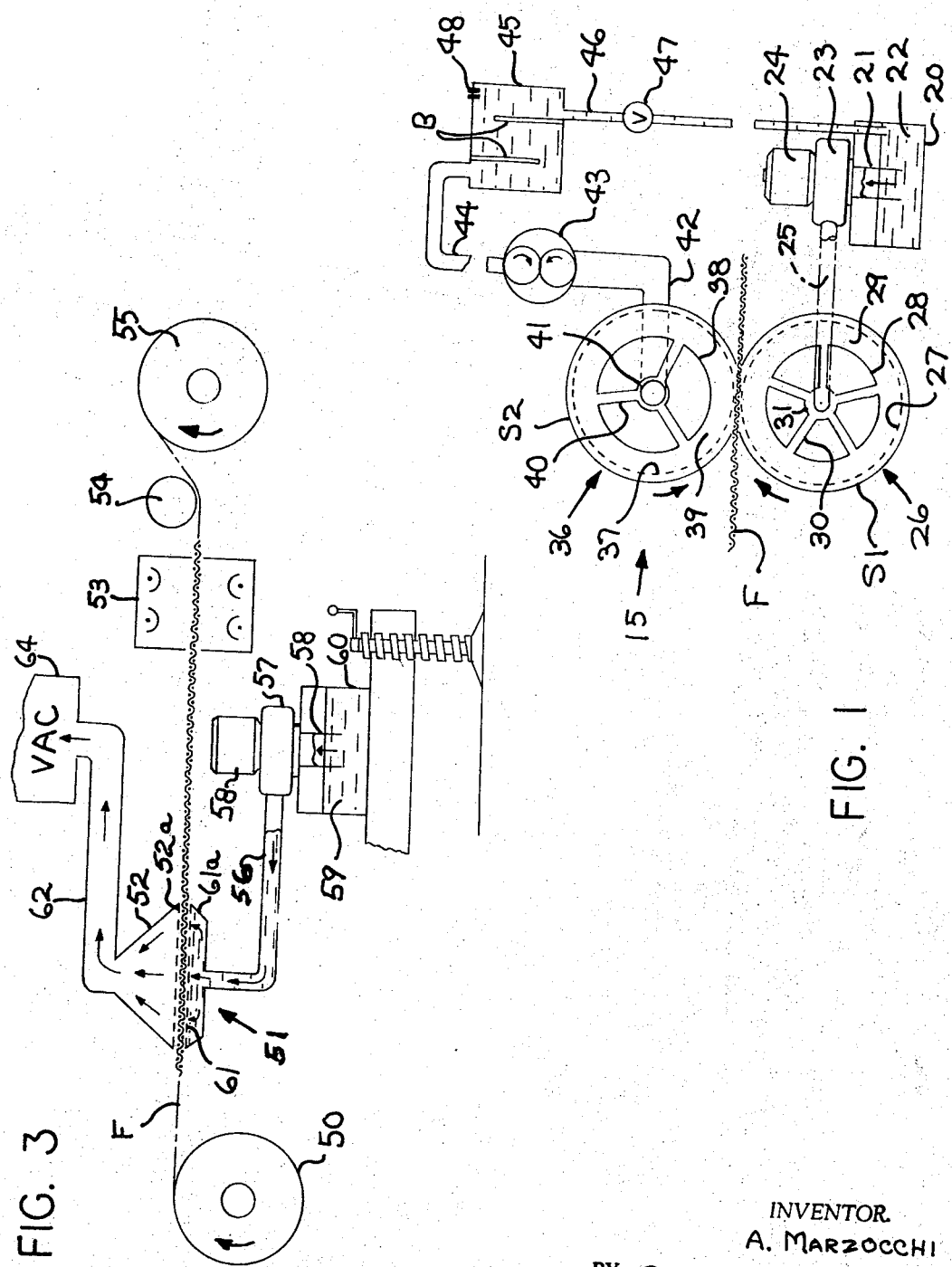
INVENTOR.
A. MARZOCCHI
BY
ATTORNEYS Oct. 13, 1970          A. MARZOCCHI          3,533,834
METHOD AND APPARATUS FOR IMPREGNATING POROUS SHEET MATERIAL
FORMED OF FIBROUS MATERIAL
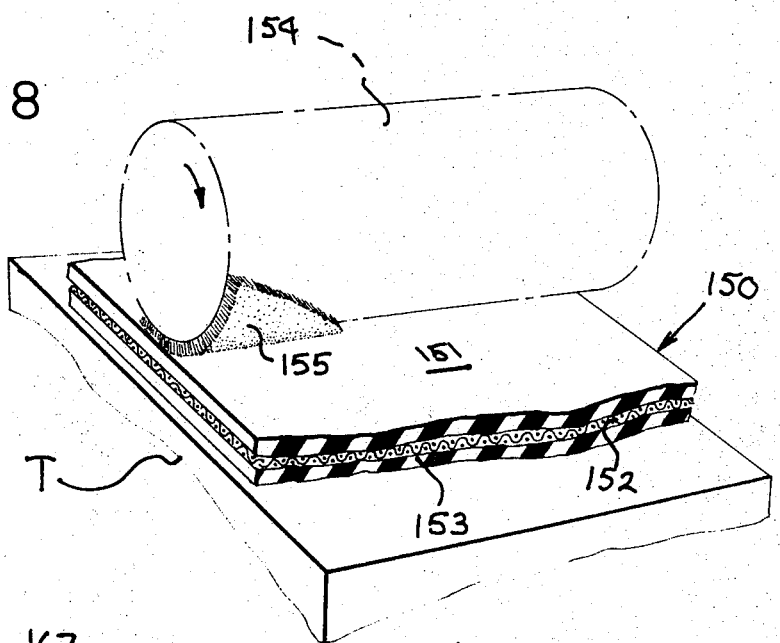
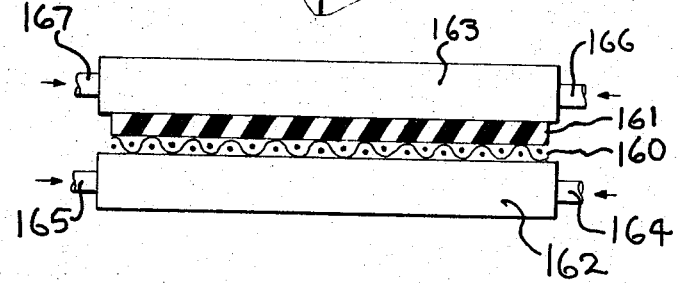
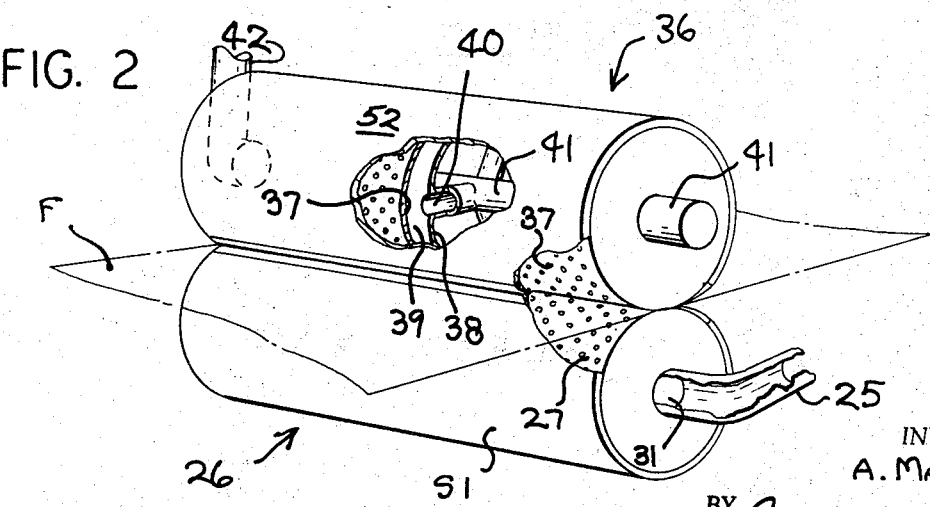
INVENTOR.
A. MARZOCCHI Oct. 13, 1970  A. MARZOCCHI  3,533,834
METHOD AND APPARATUS FOR IMPREGNATING POROUS SHEET MATERIAL
FORMED OF FIBROUS MATERIAL
Filed May 17, 1966  3 Sheets-Sheet 3
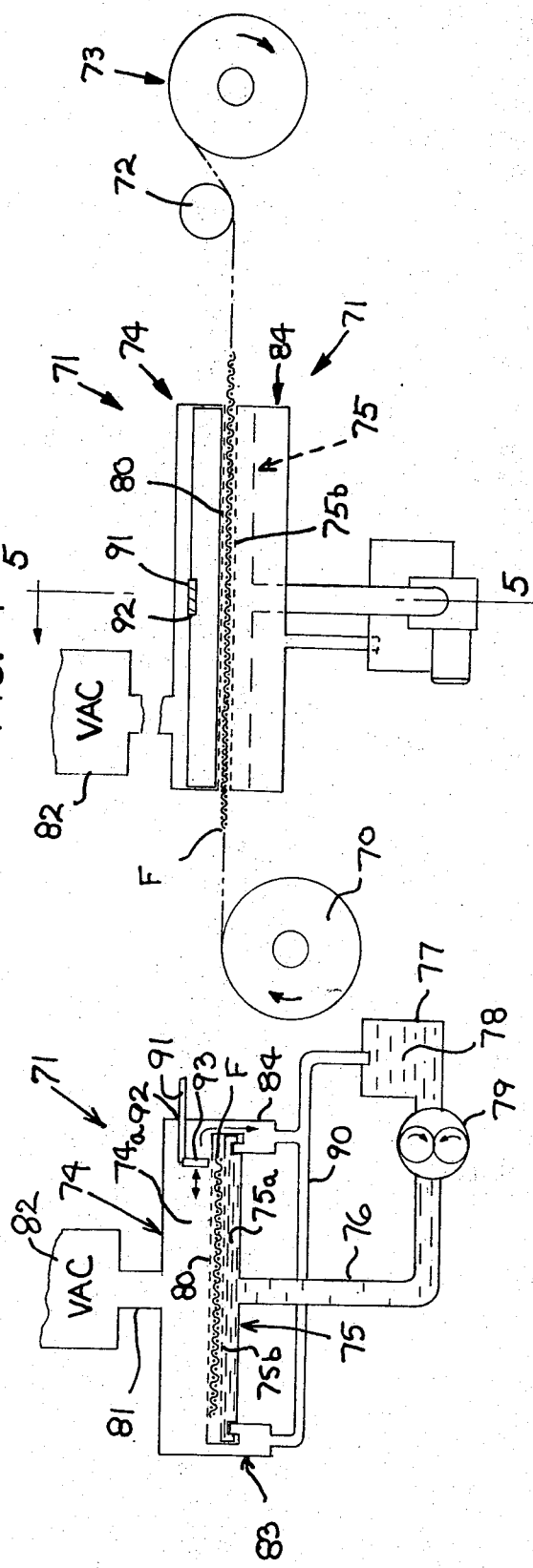
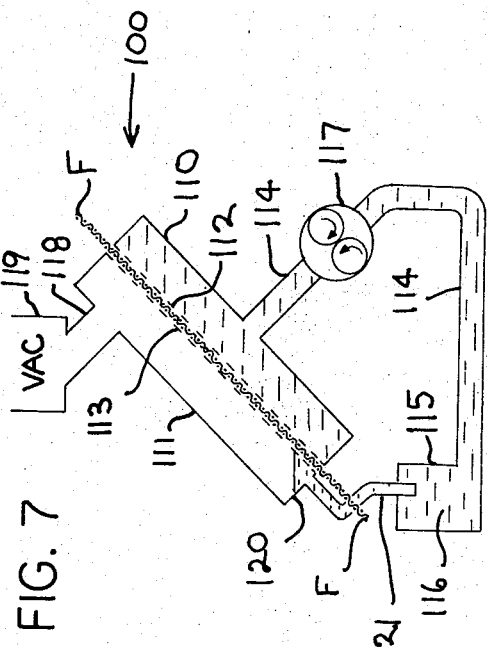
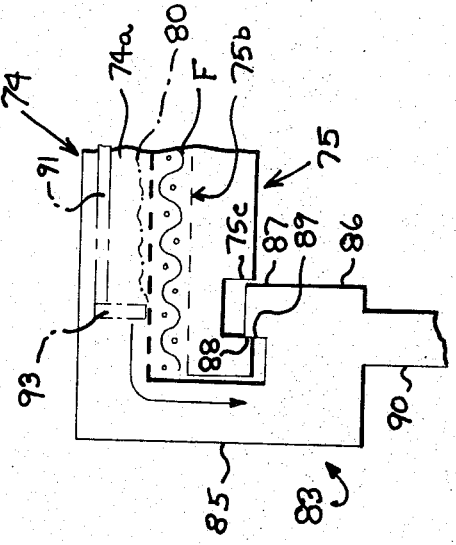
INVENTOR.
A. MARZOCCHI
BY
ATTORNEYS United States Patent Office 3,533,834
Patented Oct. 13, 1970

3,533,834
METHOD AND APPARATUS FOR IMPREGNATING POROUS SHEET MATERIAL FORMED OF FIBROUS MATERIAL
Alfred Marzocchi, Cumberland, R.I., assignor to Owens-Corning Fiberglas Corporation, a corporation of Delaware
Filed May 17, 1966, Ser. No. 550,768
Int. Cl. B05c 8/04
U.S. Cl. 117—119                                    11 Claims

ABSTRACT OF THE DISCLOSURE

A method and apparatus for impregnating porous sheet material in continuous fashion by the steps of moving the sheet goods between a lower delivery member having an upwardly facing apertured delivery surface and an upper receiver chamber having a downwardly facing apertured surface, said surfaces defining a passageway for said sheet goods, pumping impregnant from the lower delivery chamber upwardly through the apertured surface, through the sheet goods, through the apertured lower facing surface of said upper receiver member and simultaneously impressing a vacuum in said upper receiver chamber, assisting the flow of impregnant upwardly.

---

The present invention relates to an improved impregnation system including novel methods and apparatus embodying unique features of operation and construction whereby impregnation is more completely and efficiently carried out.

Textile goods in planar or web form, usually woven, are examples of porous materials desirably subject to impregnation in order to impart thereto a particular property or to generally improve the properties of the raw or previously treated textiles.

Textile sheet goods include both woven and unwoven textiles, as well as a variety of porous materials generally formed of a collected multiplicity of fibers, strands, cords (including "beam" goods), rovings and mats, etc. The fundamental element, e.g., the fiber, may be naturally occurring, such as cotton, silk, wool, etc., man-made organic, e.g., rayon, polyamide ("nylon"), polyester ("Dacron"), acrylonitrile copolymer ("Acrilan"), polyvinyl chloride, polyvinylidine chloride ("Saran"), etc., or inorganic, e.g., fiber glass, asbestos, etc.

As indicated, impregnation of these textile materials is desirably accomplished in order to combine with the textile a treating substance which either gives it a new or an improved property, e.g., increased tensile strength, resistance to abrasion, soiling, or wrinkling. Examples of treating materials used as impregnants include adhesives, repellants, resinous binder substances, vulcanizable elastomeric substances, a polymerizable monomeric combining substance, waxes, oils, etc.

Generally, impregnation is accomplished by immersing the porous sheet goods, e.g., fabric, in an aqueous or solvent solution or an emulsion of a treating substance, for example, a monomer, a resinoid, etc., which depending upon the time of immersion, effects a soaking of the treating substance into the fibers. The fibers, of course, are the elemental component of the sheet goods. Frequently, a polymerization catalyst is also present in the impregnating solution or liquid. Thereafter, the impregnated sheet goods are usually passed between spaced rollers to compress the impregnated sheet and squeeze out excess impregnant. Failure to remove excess impregnant will result in the formation of a continuous coating of the impregnating resin or treating substance on the sheet goods. Such a product is no longer an impregnated sheet but rather a continuous matrix with an interior fabric. The impregnated sheet is then usually dried at relatively low temperature, followed by a heating at a temperature to cause the resin (if the resin is the impregnating substance) to polymerize. Lastly, the sheet is washed and rinsed.

The completeness of impregnation obtained by the foregoing immersion technique is generally considered as dependent upon the viscosity of the impregnant and the length of immersion since the immersion-type impregnation conditions are relatively static. The ability of most materials to absorb (porosity), of course, is considerably varied and, as a consequence, the time of immersion ultimately in such cases determines the completeness and effectiveness of the impregnation in terms of achieving a sufficient takeup of the treating resin, monomer, elastomer, etc.

With the foregoing general introduction, it is a general object of the present invention to provide an improved impregnating system, including both apparatus and method, which system obviates shortcomings of impregnating techniques known in the art heretofore.

It is a particular object of the present invention to provide a method of impregnation composed of a novel sequence of steps which, when carried out in the preferred manner explained hereinafter and illustrated in the drawings, permits the accomplishment of an efficiency and degree of impregnation which is extremely desirable, useful and improved as compared to that known heretofore.

It is also an object of the present invention to provide an apparatus which provides for accomplishment of impregnation of a fabric at a much faster ratio, albeit the degree of impregnation is superior than known in the art up to the present time.

It is also and particularly an object of the present invention to provide a method and apparatus which conjointly operate to avoid difficulties usually inherent in impregnation operations together with elimination of residual deleterious substances present, on the fibers and/or other elemental substances making up the fabric, by reason of previous treating operations of the textile or perhaps imparted during the manufacture or processing of the textile in the fiber form.

In some applications, it is particularly objectionable to find that, subsequent to immersion impregnation, the textile in sheet form still contains on the fiber strand, or the like, a deleterious particle or retained bubble of air or other gas. A retained bubble of air or retained particle of deleterious substance may, and frequently does, interfere in subsequent combining operations wherein the textile in its impregnated form is converted into a finished product alone or after an intermediate combining step with another elemental component of the ultimately desired product or assembly.

It is therefore a principal object of the present invention to provide a method which features a positive impregnation including unidirectional flow of the impregnating material through the interstices within the elemental fibers, thereby serving to carry in this direction the contaminating gas, air and deleterious substances and, furthermore, effects removal of them from the situs of the impregnated fabric.

It is yet another object of the present invention to provide a method and apparatus which embody relative simplicity of apparatus components as well as ease in the carrying out of the novel steps; all of which cooperate to yield the ultimate desideratum.

By way of further explanation, the impregnation of fabrics by urea and melamine resinoids is generally known and applied to a variety of textiles in order to improve abrasion resistance and resilience. It is not uncommon to find resilience to be doubled and abrasion resistance to be increased by as much as a factor of 5. Also, shape, color and appearance under these conditions remain unchanged.

By way of further example, it is well known to employ transparent resins such as the acrylics to modify the properties of basic textile fabric sheet goods. Depending upon the acrylic, namely, whether it be a hard acrylic, medium acrylic or soft acrylic, the tensile strength and the abrasion resistance can be increased while the stiffness is only little effected.

Another notable application of the impregnation technique generally involved in the present invention is in the shrink proofing of wool. Treatment of wool fabric with a melamine resin effects a startling reduction in shrinking. As indicated earlier herein and as exemplified by this application, it is necessary to remove excess impregnant by passing the treated cloth through squeeze rolls to prevent a continuous coating.

As a further exemplary operation, it has been found that the impregnation system of the present invention is very utilitarian in the impregnation of sheet goods formed of woven or unwoven fiber glass materials. Glass fiber usually in the form of unwoven strands and cords, when treated with particular polymerizable elastomeric impregnants, yield sheet goods which are particularly adapted for incorporation into molded rubber goods such as hose, V-belts, tires, conveyor belts, etc. The presence of any residual contaminant on the glass fiber strand, roving or cord, or the presence of any trapped bubble of air or the like, is particularly objectionable since the ultimately molded particle, that is, after vulcanization (sometimes referred to as "curing"), will be possessed of a region or zone of weakness at the site of the discontinuity created by the deleterious contaminant, air bubble, moisture, etc.

Accordingly, it is a singular and principal object of the present invention to provide a method and apparatus for impregnating fiber glass in unwoven or woven sheet textile form with elastomeric vulcanizable substances so as to form completely impregnated sheet goods which are devoid of contaminant, air bubbles or moisture so that it is eminently satisfactory for combining with other rubber components and thereafter formed into a molded vulcanized article.

It is still a more significant object of the present invention to provide a method and apparatus which is uniquely adapted for handling the elastomeric vulcanizable type of impregnating substance.

The foregoing, as well as other objects of the present invention, will become apparent to those skilled in the art from the following more detailed description taken in conjunction with the annexed sheets of drawings on which there are presented, for purposes of illustration only, several major embodiments of the present invention.

In the drawings:

FIG. 1 is a schematic side elevation view, partially in section, of an apparatus including features of construction in accordance with one embodiment of the present invention, and further schematically illustrating one manner in which the method of the present invention may be carried out;

FIG. 2 is a perspective view of the apparatus shown in FIG. 1, with portions broken away, in order to show, more clearly, particular details of construction;

FIG. 3 is a view similar to that of FIG. 1, but illustrating an apparatus constituting a variant embodiment of the present invention and yet being capable of carrying out the method of the present invention;

FIG. 4 is a view similar to FIGS. 1 and 3, but illustrating an apparatus constituting another embodiment of the present invention and being capable of treating porous sheet material in accordance with the method of the present invention;

FIG. 5 is a sectional view taken on the line 5—5 of FIG. 4;

FIG. 6 is an enlargement of the left end segment of the apparatus shown in FIG. 5;

FIG. 7 is a side elevation view, with parts broken away, illustrating yet another apparatus in accordance with the present invention and being suitable for carrying out the impregnation method in accordance with the objects and purposes set forth hereinbefore;

FIG. 8 is a schematic perspective view illustrating a manner of treating impregnated sheet goods in accordance with yet another embodiment of the present invention; and FIG. 9 is a side elevational view, partly in section, illustrating a treatment of porous sheet goods in accordance with still another embodiment of the present invention.

Viewed most basically, the present invention envisions a novel method and apparatus for impregnating porous sheet goods, e.g., woven and nonwoven textiles, etc., by a system wherein the fluid impregnant is passed generally upwardly into the porous sheet material as the sheet goods are passing generally laterally (non-vertically), while at the same time the upper regions of the sheet goods are subjected, that is, the other side of the upwardly moving impregnant, to the influence of a reduced pressure so as to improve the degree of impregnation and, as well, simultaneously assist in the removal of any residual gaseous or otherwise unwanted substance, e.g., an air bubble, which otherwise tends to remain trapped on the fibers or within the interstices of the porous fabric sheet goods.

In a particularly preferred embodiment of the present invention, impregnant is furnished to the sheet goods in an amount which is in excess of that desirably picked up and maintained within the pores, as it were, of the fabric sheet goods. The excess impregnant is carried upwardly into an arrangement adapted to receive the excess impregnant, remove it from the situs of impregnation and return it to the original impregnant supply source.

Thus in accordance with the latter embodiment, an essentially continuous unidirectional fluid flow condition is established, that is, impregnant passing essentially and substantially upwardly and normally to and through the laterally and continuously moving porous sheet goods, whereby the optimum is achieved in terms of obtaining a completely impregnated fabric and, as well, a fabric essentially completely devoid of any gaseous or other unwanted contaminant.

Referring now more specifically to the drawings, FIG. 1 reveals an apparatus 15 adapted, by reason of its constructional features, to carry out the precepts of the present invention. Reference numeral 20 identifies a reservoir tank containing liquid impregnant. Vertical standpipe 21 extends downwardly into the impregnant 22 and connects with the inlet of a positive displacement gear pump 23 driven by a motor 24. Conduit 25 connects the outlet of pump 23 with roller 26. Rollers 26 and 36 are both cylindrical and in vertically disposed, slightly spaced relationship, with roller 26 the lower of the two. The roller 26 is composed of an outer perforate shell or wall 27 and an inner shell 28 defining therebetween an annular passageway or chamber 29. A plurality of radial pipes 30 extend communicatingly from the annular chamber 29 to manifold pipe 31 which extends axially from one end to the other end of the roll 24, being capped at one end, and connecting at the other end, as shown, with conduit 25. Upper roller 26 is similarly constructed and is composed of an outer perforate shell 37 and inner shell 38; the two defining therebetween an annular chamber 39. Radial pipes 40 extend from the annular chamber 39 to axial manifold pipe 41 which is capped at one end and connects at the other end with conduit 42. Both of the rollers 26 and 36 are provided with outer cylindrical shield members S–1 and S–2. Shield S–1 surrounds perforate shell 27 and shield S–2 surrounds perforate shell 37. Shield S–1 is open in the upper nip region, while shield S–2 is open in the lower nip region facing the void in shield S–1. In this fashion, fabric F–1 passing laterally between the nip of the slightly spaced rollers 26 and 36 passes in between the perforate shells 27 and 37 as they rotate countercurrently (as indicated by the arrows), driven by suitable drive means (not shown). The rollers 26 and 37 are desirably adjustably mounted (not shown) so that the vertical distance between their facing surfaces can be varied to accommodate different thickness fabrics and for additional reasons to be described. Exhaust conduit 42 connects with gear pump 43 and, in turn, with conduit 44; the latter extending to a surge tank 45. Reference letter B identifies several baffles located within the surge tank 45 in staggered array. Conduit 46 connects fluidly with the bottom of the tank 45, providing return of surge impregnant to the reservoir tank 20 as controlled by valve 47.

In operation, the impregnant is drawn up the standpipe 21, forced under pressure by pump 23 through conduit 25 to axial manifold pipe 31, from which the impregnant passes through the radial pipes 30 to the annular chamber 29. The impregnant then proceeds through the perforations in the upper region (not covered by shield S–1), particularly through those perforations which are in physical contact with the fabric F passing therethrough. The nip region between the perforate rolls 27 and 37 is thus furnished with an ample supply of impregnant which, in moving upwardly, urges any trapped air in the fabric through the perforation in the upper perforate shell 37 and into the annular chamber 39. The counter-rotation of the rolls and physical contact of the surfaces of roll cylinders 27 and 37 with the fabric encourages lateral movement of the impregnant, providing more complete impregnation of the fabric passing therethrough. The excess impregnant thence travels from the annular chamber 39 through radial pipes 40 to central manifold conduit 41 and out one end to exhaust conduits 42 and 44, as urged by gear pump 43, and to the surge tank 45. The surge tank desirably includes provision (baffles B) for degassing the impregnant. Thus, the fluid in the surge tank flows downwardly under the first baffle and thence upwardly and over the second baffle before it reaches exit conduit 46 leading back to the reservoir tank 20. The baffles provide a tortuous path for the liquid, allowing air or other gaseous substances to escape from the liquid and out the vent 48. A vacuum is desirably impressed on the surge tank to assist removal of air. After impregnating passage between the rolls 26 and 36, the now-impregnated fabric is desirably passed through a mild elevated temperature oven or chamber sufficient to convert the impregnated fabric to a nontacky state, whereupon it may be rolled upon itself on a takeup roll (not shown). Where drying is not desired or is not sufficient or effective to reduce the tackiness, a liner or separate sheet may be wound simultaneously so as to prevent contact and sticking. Polyethylene sheeting or cotton liners are suitable in such case.

Referring now to FIG. 3, there is schematically shown an apparatus designed to effect impregnation, of a continuously moving porous web of textile sheet goods, in an improved and more efficient manner. The fabric F is unwound from a supply roll 50 to pass horizontally between a lower hollow plate-like member 51 and an upper hood 52, thence through a heating chamber 53, about an idler roll 54 and thence wound up on a takeup roll 55. The lower member 51 is fluidly connected, via a supply conduit 56, to the outlet of a positive displacement gear pump 57 driven by a motor 58. Pump inlet line 58 extends downwardly beneath the liquid level of a supply of liquid impregnant 59 contained in a reservoir 60. The upper wall 61 of the plate-like member 51 is perforate, as indicated schematically, the plurality of apertures providing numerous passageways for upwardly flowing impregnant. The hood 52 situated in vertically registering relationship above the lower member 51, includes a planar lower wall 52b which contains a plurality of apertures similar to those in wall 61. The hood 52 is connected at its upper end to a conduit 62 which is connected to a vacuum chamber 64. In operation, the fabric F is passed essentially continuously from left to right as controlled by the pull of wind-up roll 55. Simultaneously, impregnant 59, through the operation of the motor-driven positive displacement pump, is directed to the lower members 51, filling same and urged vertically upward through the plurality of apertures in wall 61 into the fabric F. Simultaneously, the vacuum chamber 64 in cooperation with the hood 52 serves to create a region of reduced pressure just above the fabric being impregnated; that is, within the hood 52. The lower perimetric edges of the hood 52a are spaced in close proximity to the moving fabric and desirably include a depending flexible strip 52a (in the nature of a squeegee strip) to confine the zone of reduced pressure to that within the hood 52. In other words, the edge 52a is designed to reduce to a minimum any leak in the vacuum within the hood 52. Similarly, the upper perimetric edges of the perforate wall 61 are desirably inclusive of a resilient rubber-like strip to preclude, or hold to a minimum, escape of the impregnant from the lower member 51 as furnished by the pump 57. The reduced pressure within the hood 52 assists the movement of the impregnant upwardly into the voids within the fabric being impregnated and, as well, assists removal of any air bubbles carried upwardly by the impregnant in its path through the sectional thickness of the fabric. The speed of the fabric movement is controlled together with the volume of impregnant pumped by pump 57 so as to yield the proper amount of impregnant per unit of fabric.

Reference may now be had to FIGS. 4, 5 and 6, wherein there is disclosed another embodiment of the present invention in which fabric F proceeding from a supply roll 70 passes through an impregnating apparatus 71, about an idler roll 72, and is thence wound on a product wind-up roll 73. The apparatus 71 is composed of an upper member 74 and a lower member 75; both of which are hollow to define, respectively, upper chamber 74a and lower chamber 75a (FIG. 5). Lower member 75 includes an upper wall 75b which contains a large number of apertures defining pathways for impregnant. The interior chamber 75a of lower member 75 is connected fluidly via pipe 76 with a supply tank 77 in which is maintained a supply of impregnant 78. A positive displacement gear pump 79 in the pipe 76 serves to supply impregnant under pressure to the interior chamber 75a of lower member 75. The upper chamber 74a includes a lower perforate wall 80. The perforate wall 80, as viewed in plan (not shown), is generally coextensive with the upper perforate wall 76b of lower member 75. The spacing between these walls 80 and 75b define a lateral passageway through which the fabric F passes in the apparatus 71, in a manner similar to that described earlier herein in connection with FIG. 4. The upper chamber 74a connects via conduit 81 with a vacuum chamber 82. The upper member 74 includes lateral troughs 83 and 84 integrally formed on the marginal portions thereof, as viewed in FIG. 5. The details of construction of the left-hand trough 83 are shown in more detail in the enlarged view identified as FIG. 6. The troughs are linearly coextensive with the member 74, as viewed in FIG. 4. The trough 83 includes a downwardly projecting leg portion 85 and a horizontal portion 86 which undercuts the marginal edge of lower member 75. A flange-like upstanding shoulder 87 extends upwardly from the portion 86 to project into downwardly opening groove 75c formed on the underside of lower member 75. The ridge-like shoulder 87 within downwardly opening groove 75c, and particularly the contact of the facing vertical surfaces thereof, identified by the reference numerals 88 and 89, provides a fluid seal, at the same time permitting some vertical adjustments as to the spacing between the upper member 74 and the lower member 75. The troughs 83 and 84 are, in effect, extensions of the chamber 74a within upper member 74. Each of the troughs connect via conduit 90 with the supply tank 77, thereby providing for return of excess impregnant.

A horizontal arm 91 (FIG. 5) extends through a slot 92 formed in the upper member 74 and has a squeegee member 93 secured to the inner end thereof located within the interior chamber 74a. The squeegee 93 is located as to smoothly scrape the upper surface of the lower perforate wall 80 responsive to horizontal movement of the arm 91, as indicated by the arrows (FIG. 5). The squeegee 93 is also shown in dotted outline in FIG. 6 at its leftmost extent. In operation, the fabric is moved continuously in the direction indicated by the arrows (on the supply and wind rolls 70 and 73). At the same time, the liquid impregnant, pumped by the pump 79, moves up through the conduit 76 into the chamber 75a of the lower member 75. Continued pumping causes the liquid impregnant to proceed upwardly through the apertures in upper wall 75b into the space between the walls 75b and 80 and into impregnating contact with the fabric F. Excess impregnant proceeds up through the apertures in the upper wall 80 of member 74 as assisted by the vacuum arrangement 82. Excess impregnant collects on the upper surface of wall 80 and is scraped laterally via the squeegee 93a to the marginal edges of wall 80 where it falls downwardly into troughs 83 and 84 from which it flows by gravity through conduit 90 to the supply tank 77 for recirculation. The movement of excess liquid impregnant as urged by the squeegee and its vertical falling movement in the vertical leg segment 85 of trough 83 is shown in dotted outline in FIG. 6. The positive flow of liquid upwardly through the fabric serves to carry away any air or other contaminant.

Although not shown in this figure, it will be appreciated that before being wound on the wind-up roll 73 the impregnated fabric or porous sheet goods may be given a heat treatment so as to reduce it to a nontacky state. This, of course, may be done in a mild hot air oven or in a chamber equipped with infrared source, Calrod units, or like energy sources selected to accommodate the particular nature (chemical and physical) of the impregnating system concerned.

In FIG. 7, an apparatus 100 representing a variant embodiment of the present invention is schematically illustrated. The fabric F, to be impregnated therein, passes in an upwardly inclined path between two opposed hollow plates 110 and 111 which are similarly inclined at about 45 degrees. The facing walls 112 (above) and 113 (below), respectively of the plates 110 and 111, each contain a large plurality of holes or apertures in a fashion similar to the previously discussed embodiments. The lower plate 110 is connected via conduit 114 with a supply tank 115 containing impregnant 116. A gear pump 117 serves to pump impregnant via the conduit 114 to the hollow plate 110. The upper plate 111 is fluidly connected via conduit 118 with a vacuum chamber 119. The lower end 120 of the upper hollow plate 111 is connected via line 121 with the reservoir tank or supply tank 115. In operation, the impregnant proceeds through the line 114 to the hollow plate 110, thence through the apertures in the wall 112 into the fabric, continuously moving thereacross and thence through the apertures in the wall 113. The excess impregnant drains by gravity along the upper surface of wall 112 to collect at the lower left end, in the manner illustrated in FIG. 7, from which it proceeds to fall by gravity through conduit 121 and back to the supply tank 115. For clarity of illustration, the supply roll and wind-up roll for the fabric sheet goods, as well as the drying oven, are not shown. It will be understood that means are also provided for adjusting the space between the plates whereby spacing between walls 112 and 113 may be varied to accommodate various thicknesses of sheet goods, variations in the viscosity of the impregnant and variations in porosity of the fabric goods. It will also be appreciated that the perimetric edges of the walls 112 and 113 are desirably provided with depending resilient strips to serve as a seal, reducing the propensity for the impregnant to escape out the marginal edges of the opposed hollow plates 110 and 111.

There are a number of impregnating compositions which may be employed in the impregnation method of this invention. Several multi-component impregnating compositions of utility in impregnating assemblies of either woven or unwoven (beamed) glass cords are set forth in the following examples.

EXAMPLE 1

| | Parts by weight |
|---|---|
| Resorcinol formaldehyde resin (38% by weight solids) | 10 |
| Natural rubber latex (50% by weight solids) | 5 |
| Anchoring agent (gamma-aminopropyltriethoxy silane) | 0.5 |
| Water | 84.5 |

EXAMPLE 2

| | Parts by weight |
|---|---|
| Resorcinol formaldehyde resin (38% by weight solids) | 10 |
| Natural rubber latex (50% by weight solids) | 5 |
| Anchoring agent (gamma-aminopropyltriethoxy silane) | 0.5 |
| Glass fiber lubricant (cationic amine—such as pelargonate amide solubilized with acetic acid) | 1 |
| Water | 83.5 |

EXAMPLE 3

| | Parts by weight |
|---|---|
| Natural rubber latex-resorcinol formaldehyde resin dispersed in aqueous medium at 40% solids (Lotol 4150) | 15 |
| Amino silane anchoring agent | 3 |
| Water | 82 |

EXAMPLE 4

| | Parts by weight |
|---|---|
| Resorcinol formaldehyde resin (37% solids) | 2.0 |
| Formaldehyde (31% solution) | 1.0 |
| Ammonium hydroxide | 2.7 |
| Vinyl pyridine terpolymer latex (42% solids) | 25.0 |
| Neoprene rubber latex (50% solids) | 41.0 |
| Butadiene latex (60% solids) | 5.0 |
| Sodium hydroxide | 0.05 |
| Alpha aminopropyltriethoxy silane | 1.0 |
| Peroxide catalyst | 1.0 |
| Water | 1100.0 |

Glass fiber assemblies such as strands, strand assemblies, cords, woven and unwoven sheet goods, e.g., cloth and "beamed" material, when impregnated with any of the foregoing compositions, particularly in accordance with the method of the present invention as herein described, are uniquely prepared to be combined with other rubber stock goods and converted through vulcanization into molded rubber products such as hose, belting (conveyor and drive), tape, tires and other applications where the end use application suggests the desirability of reinforcement.

It is an important feature of the present invention that the methods and aparatus as disclosed herein provide for an upward flow of impregnant through a member which functions as a manifold in that it distributes the impregnant over a fairly wide area. In the several embodiments, this member is a hollow planar plate, as described, having a large plurality of apertures in the upper wall thereof. This construction provides a pressure which is essentially constant and uniform since a pressure impressed on a liquid at any point will reflect itself at all other points at the same elevation. The fluid impregnant thus passes relatively uniformly upwardly through the interstices of the fabric carrying therewith any gaseous contaminant such as an air bubble. It is also envisioned that other contaminants, as well, may be removed. Lateral movement of the impregnant can also be provided for by the spacing of the facing surface of the plate members which causes some physical compression and displacement of the fluid. This is also true of the embodiment of FIGS. 1 and 2 featuring counterrotating rolls. Finally, the fluid flows up through the apertures in the upper member as assisted by vacuum and is removed. It will be appreciated that as to the other contaminants (that is, other than air), a filtering or a clarifying means may be employed in conjunction with the surge tank or in the conduit returning impregnant to the supply tank.

In accordance with further embodiments of the present invention, systems are envisioned for achieving optimum impregnation of porous sheet goods; more specifically, a fabric formed from a loosely twisted woven roving. One approach envisioned contemplates application, to the fabric before contact with the impregnating rubber composition, of a coating of a material which is plasticizing in effect toward the ultimate impregnating rubber composition. The subsequent contact with the rubber composition will increase the impregnation achieved since the surface of the fabric components, that is, the surface of the strand and roving elements composing it, will, by reason of the borne coating of softener, possess the ability to lower the viscosity of the rubber as it is moved, by appropriate pressure, into enveloping relationship with the fabric components. As a further embodiment, it is proposed that the surface of the rubber stock, which is ultimately adapted for initial and facing contact with the woven roving fabric, be first coated with a plasticizer substance for the rubber stock such that the facing layer of the rubber stock is lower in viscosity by reason of the plasticization and therefore more receptive to assuming enveloping and/or impregnating relationship with the fabric components, e.g., the roving, strand, etc. A steam treatment of the fabric prior to contact with the rubber or use of a heated softener or plasticizer can be beneficial as the subsequent contact with rubber or natural cooling will result in a condensation, producing thereby an internal reduction in pressure, aiding impregnation.

In accordance with a further provision for encouraging greater impregnation, the subassembly, that is, contiguous sheets of fabric and rubber stock, are passed beneath a roller bearing a large number of radially extending needles. The latter is, for example, illustrated in FIG. 8, wherein the stock assembly or sandwich 150, composed of an upper layer of rubber stock 151, an intermediate impregnated glass fiber woven roving fabric 152 and a lower rubber stock layer 153, is passed beneath a roller 154. The roller contains a plurality of radially extending needles or prongs 155; the fabric passing therebeneath on a table T. The sandwich 150 passing beneath the roll 154 driven by suitable means, not shown, is physically tacked together, as it were, by the actual penetration of the sandwich by the plurality of needles or prongs. The spacing between the table T and the roller is controlled so that the needles penetrate all three layers of the sandwich 150.

In FIG. 9, there is illustrated a variant embodiment for improving the impregnation of a fabric layer 160 by a sheet-like layer of rubber stock 161. In this embodiment, the two are located in facing relationship between a lower platen 162 and an upper platen 163 provided with an inlet 164 and an outlet 165 (in the case of the lower platen 162) and an inlet 166 and an outlet 167 (in the case of the upper platen 163). These ptatens are hollow and are adapted to have circulated therein a heat transfer medium, for example, steam, water or oil, in order to impart the appropriate desired temperature to the facing surfaces of the platens (in contact with the sandwich therebetween). In accordance with this embodiment, the temperature within the platen 162 is adjusted at a higher temperature than that in the platen 163, whereby the region of the rubber layer 161 in closest proximity thereto and at the same time in closest proximity to the fabric 160 is softer due to the higher temperature, thus favoring movement of the fabric into the interstices and voids between the filament and roving components of the fabric 160.

While a number of variant embodiments and alternative techniques have been disclosed herein for phrposes of describing the best mode of practicing the invention, it is not intended that the scope of invention be delimited thereto unless so specified in the appended claims.

I claim:

1. The method of impregnating porous sheet goods such as textiles, unwoven mat, "beamed" strand goods, said method comprising:
   continuously moving said sheet material in a non-vertical path,
   continuously directing said sheet material while in said path between a pair of opposed upper and lower members, each of said members having a perforate wall portion in facing relationship, thereby defining a path for said sheet material,
   continuously directing impregnant through said perforations in the said lower wall into said porous sheet goods and thence into said perforations in said upper wall portion and
   continuously subjecting the region on the side of the upper wall opposite said path to the influence of reduced pressure, thereby assisting in the flow of said impregnant and removal of air and like contaminants located within the interstices of said sheet goods.

2. The method of impregnating porous sheet goods such as textiles, unwoven mat, "beamed" strand goods, said method comprising:
   continuously moving said sheet material in a non-vertical path,
   continuously directing said sheet material while in said path between a pair of opposed upper and lower members, each of said members having a perforate wall portion in facing relationship, thereby defining a path for said sheet material,
   continuously directing impregnant through said perforations in the said lower wall into said porous sheet goods and thence into said perforations in said upper wall portion,
   continuously subjecting the region on the side of the upper wall opposite said path to the influence of reduced pressure, thereby assisting in the flow of said impregnant and removal of air and like contaminants located within the interstices of said sheet goods and
   wiping excess impregnant off the upper surface of said upper wall.

3. The method as claimed in claim 2, which includes the step of collecting impregnant wiped off said upper surface.

4. Impregnating apparatus for porous sheet goods comprising a delivery member including an upper wall portion having a plurality of apertures and an internal chamber in fluid communictation with said apertures, a receiver member including a lower wall portion having a plurality of holes and an internal chamber in fluid communication with said holes, means for mounting said members with said upper wall and lower wall portions in spaced proximity defining a passageway for the item to be impregnated, means for continuously moving continuous sheet material through said passageway, means for pumping impregnant (a) into said interior chamber of said delivery member, (b) upwards through said apertures into sheet goods moving through said passageway and then (c) through said holes into said receiver member, and means for establishing a reduced pressure in the internal chamber within said receiver member.

5. Apparatus as claimed in claim 4 wherein said members are cylindrical.

6. Apparatus as claimed in claim 4 wherein said wall portions are planar and in substantial registration viewed in plan.

7. Apparatus as claimed in claim 4 which includes trough collection means formed marginally proximate the upper surface of said lower wall portion of said receiver member to collect excess impregnant.

8. Apparatus as claimed in claim 4 wherein said wall portions are inclined and the upper surface of said lower wall portion of said receiver member define a wall of said internal chamber within said receiver member, whereby excess impregnant drains by gravity along said upper inclined surface to collect in the lower region of said receiver member.

9. Apparatus for impregnating sheet goods, said apparatus comprising:
- vertically spaced upper and lower roll members, each containing outer and inner cylindrical walls defining an annual chamber, each of the outer walls of said members containing a large plurality of apertures in communication with the chamber therewithin,
- means for vertically moving one of said roller memmers to vary the distance therebetween,
- said roll members each including a tubular conduit axially disposed therein,
- said roll members each including at least one generally radial passageway extending in fluid sealed fashion from the annular passageway to said tubular conduit,
- means for rotating said cylinders in counterrotation,
- means for delivering sheet material between said roll members and in facing relationship with said apertures below and above,
- a reservoir tank for impregnant substance,
- delivery conduit means fluidly connecting said tank and one end of said tubular conduit in said lower cylinder,
- return conduit means fluidly connecting said reservoir tank and one end of the tubular conduit in said upper cylinder,
- pump means for delivering impregnant from said reservoir tank through said delivery conduit to said tubular conduit, to said annular passageway, through said apertures in the lower member, through said material and to the apertures in the outer wall of said upper roll member,
- vacuum means for assisting movement of excess impregnant not retained by said sheet mateiral, together with air and other gaseous substances normally trapped in said sheet material, upwardly through said material, through said apertures in the outer wall of said upper roll member and into said upper roll member.

10. Apparatus as claimed in claim 9 which includes baffle means for degassing impregnant.

11. Apparatus for impregnating porous sheet material formed of fibrous materials, said apparatus comprising:
- vertically spaced upper and lower plate members, each containing an interior chamber, each of the facing walls of said members containing a large plurality of apertures in communication with the chambers within,
- means for vertically moving one of said members to vary the distance between said facing surfaces,
- means for delivering sheet material between said plate members and in facing relationship with said apertures in the walls below and above,
- a reservoir tank for impregnant substance,
- delivery conduit means fluidly connecting said tank and the chamber in the lower plate member,
- return conduit means fluidly connecting said reservoir tank and the interior chamber in said upper plate member,
- pump means for delivering impreganant from said reservoir tank through said delivery conduit to said lower chamber, through said apertures in the lower facing wall, through said material and to the apertures in the upper facing wall of said upper plate member, and
- a vacuum means connected with said upper chamber for assisting movement of excess impregnant not retained by said sheet material, together with air and other gaseous substances normally trapped in said sheet material, upwardly through said material, through said apertures in the upper wall of said upper plate member and into said upper chamber.

References Cited

UNITED STATES PATENTS

| 1,338,624 | 4/1920 | Heppes et al. | 117—119 |
| 1,933,837 | 11/1933 | Arnold. | |
| 2,219,663 | 10/1940 | Schuster. | |
| 2,367,819 | 1/1945 | Carter | 117—56 X |
| 3,033,702 | 5/1962 | Fenselau | 117—119 X |
| 3,084,661 | 4/1963 | Roberts | 118—50 |
| 3,207,640 | 9/1965 | Walker | 117—119 X |
| 3,234,041 | 2/1966 | Rosecrans | 117—120 X |
| 3,303,816 | 2/1967 | Lauring. | |
| 1,884,486 | 10/1932 | Zavertnick | 117—119 X |

RALPH S. KENDALL, Primary Examiner

U.S. Cl. X.R.

117—111, 120; 118—50, 203, 419